(12) United States Patent
Kwon et al.

(10) Patent No.: US 7,612,861 B2
(45) Date of Patent: Nov. 3, 2009

(54) LIQUID CRYSTAL DISPLAY PANEL CAPABLE OF MINIMIZING A DEFECT RATE CAUSED BY BRIGHT POINT AND REPAIRING METHOD THEREOF

(75) Inventors: Oh Nam Kwon, Yongin-si (KR); Seung Hee Nam, Suwon-si (KR)

(73) Assignee: LG. Display Co., Ltd., Seoul (KR)

( * ) Notice: Subject to any disclaimer, the term of this patent is extended or adjusted under 35 U.S.C. 154(b) by 668 days.

(21) Appl. No.: 11/205,983

(22) Filed: Aug. 17, 2005

(65) Prior Publication Data
US 2006/0279681 A1    Dec. 14, 2006

(30) Foreign Application Priority Data
Jun. 13, 2005 (KR) .............. 10-2005-0050615
Aug. 5, 2005 (KR) .............. 10-2005-0071948

(51) Int. Cl.
G02F 1/1333 (2006.01)
(52) U.S. Cl. .............. 349/158; 349/54; 349/122
(58) Field of Classification Search .............. 349/158, 349/54, 122
See application file for complete search history.

(56) References Cited

U.S. PATENT DOCUMENTS

| | | | |
|---|---|---|---|
| 5,267,066 A * | 11/1993 | Nakai et al. | 349/110 |
| 5,771,039 A * | 6/1998 | Ditzik | 345/178 |
| 6,091,078 A * | 7/2000 | Codama | 257/40 |
| 6,280,273 B1 * | 8/2001 | Codama | 445/24 |
| 6,639,360 B2 * | 10/2003 | Roberts et al. | 313/512 |
| 6,985,275 B2 * | 1/2006 | Miyazawa | 359/245 |
| 7,075,112 B2 * | 7/2006 | Roberts et al. | 257/79 |
| 7,318,907 B2 * | 1/2008 | Stark et al. | 422/50 |
| 7,364,622 B2 * | 4/2008 | Hasei et al. | 118/321 |

FOREIGN PATENT DOCUMENTS

| | | | |
|---|---|---|---|
| EP | 0 506 454 | | 3/1992 |
| EP | 0506454 A2 | * | 9/1992 |
| JP | 4-301672 | | 10/1992 |
| JP | 04301672 A | * | 10/1992 |
| JP | 5-2160 | | 1/1993 |
| JP | 5-181099 | | 7/1993 |
| JP | 5-210074 | | 8/1993 |
| JP | 6-308442 | | 11/1994 |
| JP | 06308442 A | * | 11/1994 |
| JP | 2003-241155 | | 8/2003 |
| JP | 2005-189360 | * | 7/2005 |
| JP | 2005189360 A | * | 7/2005 |

OTHER PUBLICATIONS

Office Action dated Feb. 10, 2006 for European Search Report 0523268.1.
Office Action issued in corresponding Japanese Patent Application No. 2005-362701; mailed Feb. 4, 2009.

* cited by examiner

*Primary Examiner*—Mike Qi
(74) *Attorney, Agent, or Firm*—Brinks Hofer Gilson & Lione

(57) ABSTRACT

A liquid crystal display penel includes a substrate, a hole disposed in the substrate, and an opaque substance filling in the hole. The hole is configured to be located in an area corresponding to a bright point. The liquid crystal display penel may minimize a defect ratio and improve a yield by darkening the bright point.

17 Claims, 20 Drawing Sheets

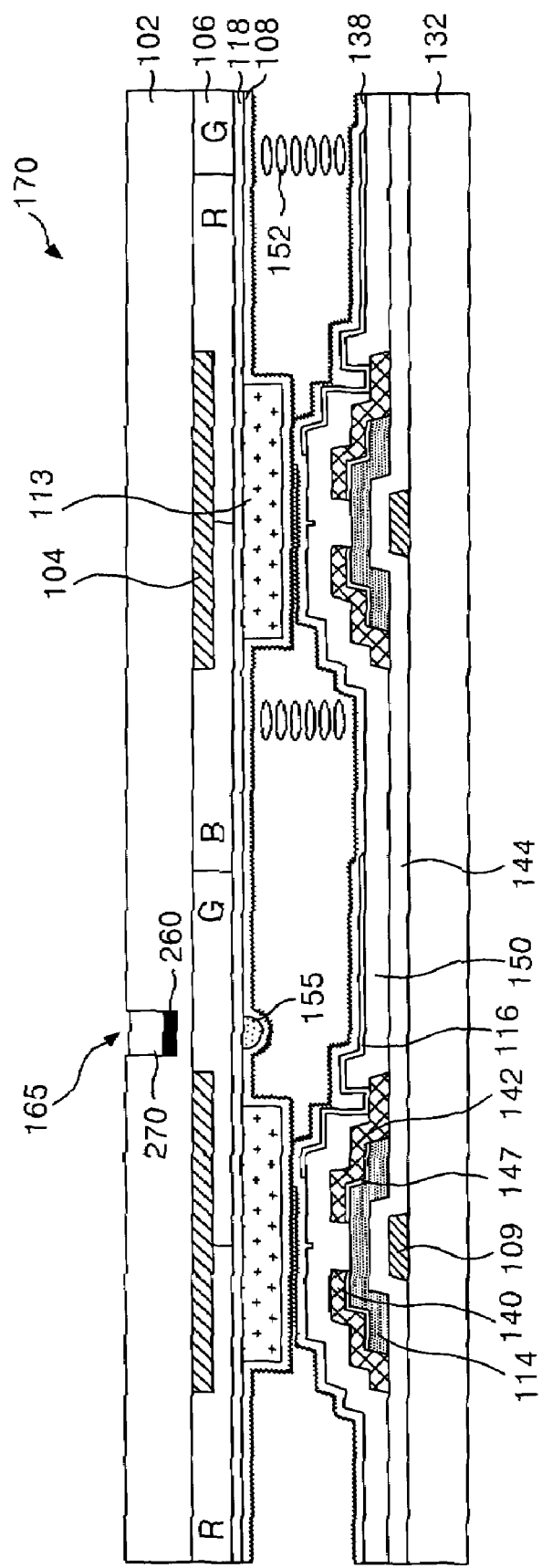

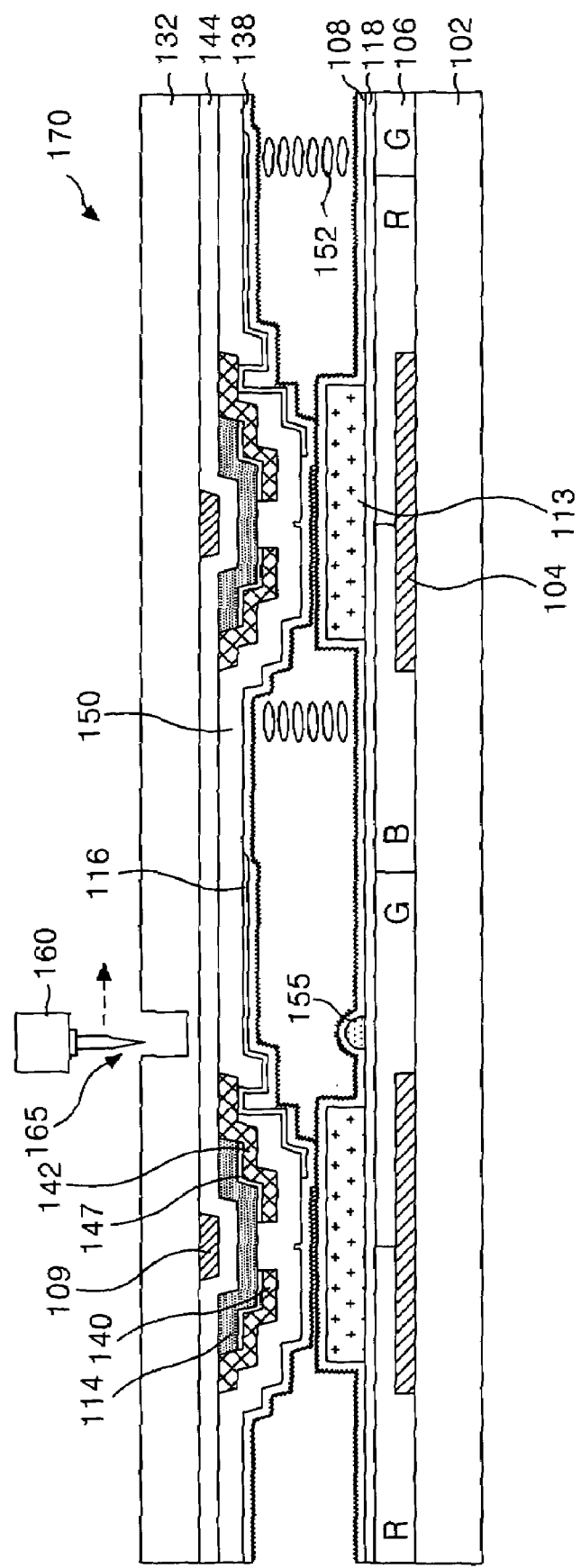

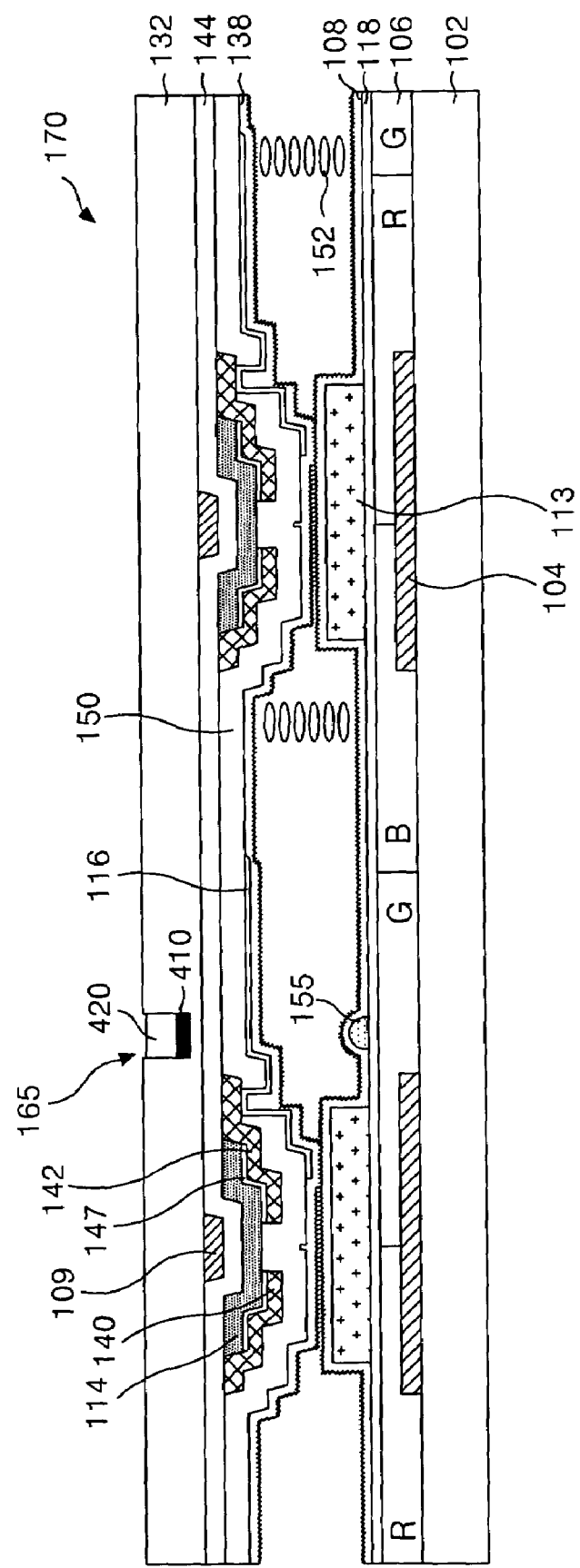

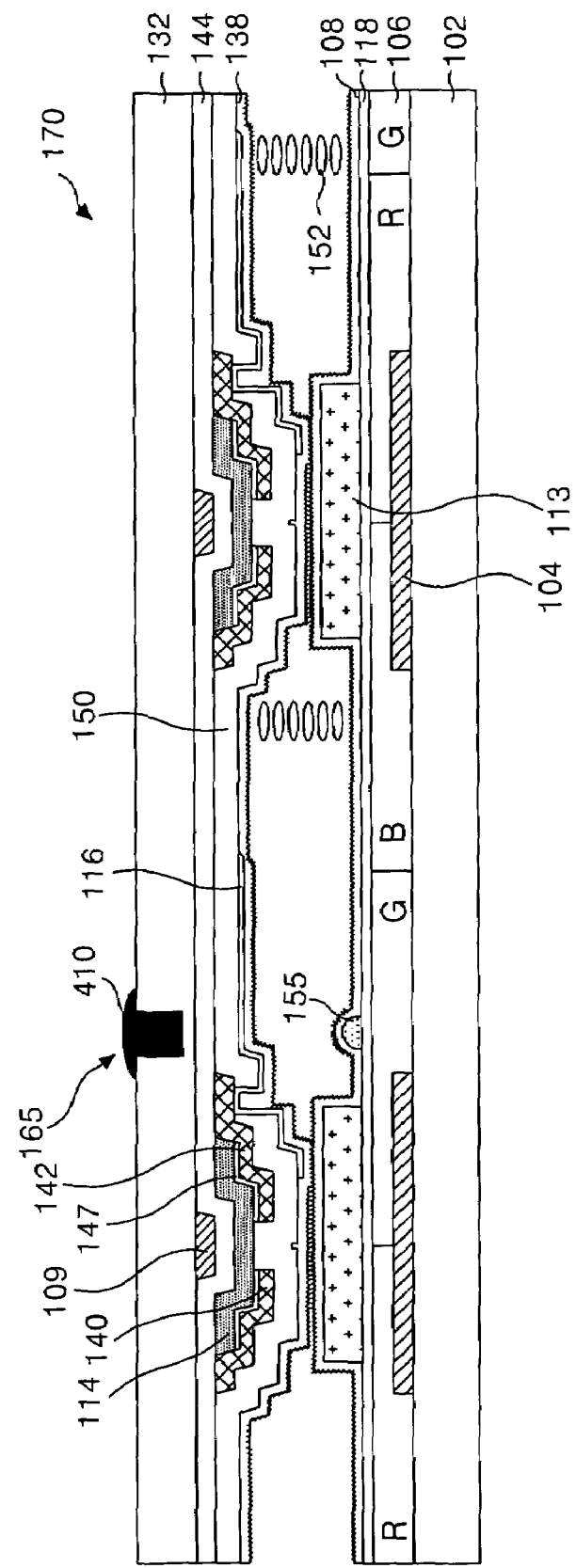

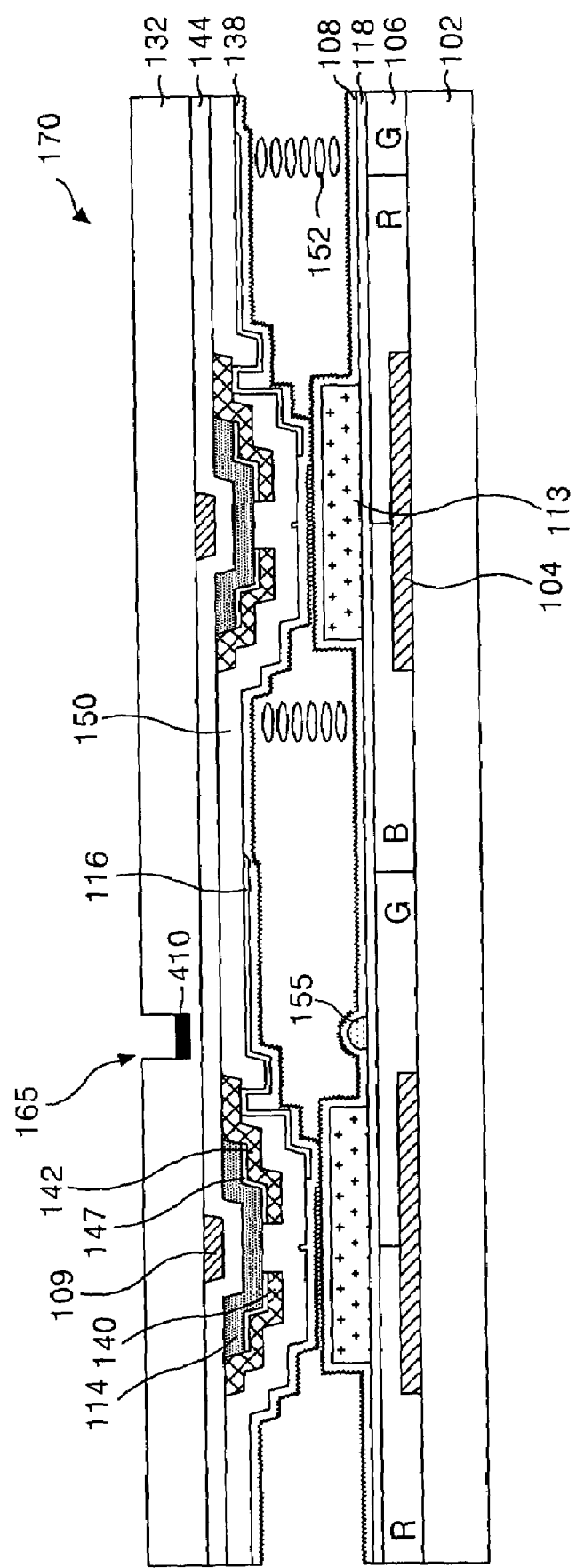

LIQUID CRYSTAL DISPLAY PANEL CAPABLE OF MINIMIZING A DEFECT RATE CAUSED BY BRIGHT POINT AND REPAIRING METHOD THEREOF

This application claims the benefit of Korean Patent Applications Nos. P2005-50615 filed in Korea on Jun. 13, 2005, and P2005-71948 filed in Korea on Aug. 5, 2005, each of which is hereby incorporated by reference by its entirety.

BACKGROUND

1. Technical Field

The invention relates to a liquid crystal display panel and repairing method thereof, and more particularly, to a repairing system of a liquid crystal display panel capable of minimizing a defect ratio and improving a yield.

2. Related Art

A liquid crystal display (LCD) device controls the light transmittance of a liquid crystal material in accordance with a video signal to display a picture. The liquid crystal display device includes a liquid crystal display panel in which liquid crystal cells are arranged in a matrix shape, and a drive circuit that drives the liquid crystal display panel.

The liquid crystal display device is divided into two types in accordance with the electric field direction driving a liquid crystal material. For a twisted nematic ("TN") mode, a vertical direction electric field is used and for an in-plan switch ISP mode, a horizontal direction electric field is used.

For the TN mode, the liquid crystal material is driven by a vertical electric field between a pixel electrode and a common electrode which are arranged to be opposite in an upper substrate. The TN mode has a large aperture ratio and a small viewing angle. For the IPS mode, the liquid crystal material is driven by a horizontal electric field between the pixel electrode and the common electrode which are arranged in parallel on a lower substrate. The IPS mode has a large viewing angle and a small aperture ratio.

FIG. 1 is a sectional view illustrating a liquid crystal display panel 1 of TN mode of the related art. Referring to FIG. 1, the related art TN mode liquid crystal display panel 1 includes an upper array substrate 2, a lower array substrate 32, and a liquid crystal material 52 injected into an inner space between the upper array substrate 2 and the lower array substrate 32. The upper array substrate 2 (or a color filter array substrate) includes a black matrix 4, a color filter 6, a common electrode 18, and an upper alignment film 8 which are sequentially formed on an upper substrate 2. The lower array substrate 32 includes a thin film transistor (hereinafter, referred to as "TFT"), a pixel electrode 16 and a lower alignment film 38 which are formed on the lower substrate 32.

If the liquid crystal display panel 1 is driven in an IPS mode, it may have the common electrode 18 formed on the lower substrate 32. An overcoat layer is formed on the color filter 6 of the upper substrate 2. The overcoat layer compensates a step difference of the color filter 6.

In the upper array substrate 2, the black matrix 4 is formed on the upper substrate 2 and corresponds to an area of gate lines and data lines (not shown) and a TFT area of the lower array substrate 32. The black matrix 4 prevents light leakage and absorbs an external light, thereby acting to increase contrast. A cell area is provided where a color filter 6 is to be formed. The color filter 6 is formed to extend to the black matrix 4 and the cell area is divided by the black matrix 4. The color filter 6 is formed with R, G and B filters to realize R, G and B colors. A common voltage is supplied to the common electrode 18 to control the movement of the liquid crystal material 52. A pattern spacer 13 acts to keep a cell gap between the upper array substrate 2 and the lower array substrate 32.

In the lower array substrate 32, the TFT includes a gate electrode 9 formed on the lower substrate 32 along with a gate line; semiconductor layers 14, 47 overlapping the gate electrode 9 with a gate insulating film 44 disposed therebetween; and source/drain electrodes 40, 42 formed together with a data line (not shown) with the semiconductor layers 14, 47 disposed therebetween. The TFT supplies a pixel signal to a pixel electrode 16 from the data line in response to a scan signal from the gate line. The pixel electrode 16 is in contact with the drain electrode 42 of the TFT via a contact hole. A passivation film 50 is formed between the pixel electrode 16 and the drain electrode 42 and made from a transparent conductive material with high light transmittance. Upper and lower alignment films 8 and 38 are used to align the liquid crystal material 52 and formed by applying an alignment material such as polyimide and performing a rubbing process.

If a defect is generated at each thin film of the upper array substrate 2 and the lower array substrate 32 of the related art liquid crystal display panel 1, a repair is performed by using a rework or laser. However, if a particle is soundly settled between the thin films of both the upper array substrate 2 and the lower array substrate 32, the repair may be difficult with the rework or laser.

FIG. 2 is a sectional view for explaining an alignment defect caused by particle in the air, and FIG. 3 is a photo illustrating a bright point caused by the particle upon realizing a picture.

FIG. 2 illustrates particle 55 that occurs during manufacturing process of a liquid crystal display panel 1. In the chamber within which a designated thin film is formed or in case that it is moved to a separate chamber or a third location to form another thin film, the particle 55 may be soundly settled between the thin films, e.g., the common electrode 18 and the upper alignment film 8 as shown in FIG. 2. The alignment film 8 adjacent to the particle 55 may not be uniformly rubbed in a rubbing process, thereby generating a non-uniform alignment area A. Further, a portion of the color filter is separated by a defect on the process upon forming the color filter. Accordingly, a problem that the particle is intermixed is frequently generated.

The non-uniform alignment area A generates the light leakage in the liquid crystal display panel 1, and such a light leakage intercepts a light transmittance of the liquid crystal material. As a result, a bright point appears in the liquid crystal display panel as shown in FIG. 3. A dark point is an area that appears dark in case of realizing a high gray, and a bright point is an area that appears bright by the light leakage in case of realizing a low gray. Human eyes are relatively more sensitive to the bright point than the dark point. Thus, a stricter standard applies to the bright point defect than the dark point defect in determining the quality of the panel. A liquid crystal display panel having a bright point defect may be wasted or subject to a substantially reduced marketability. Accordingly, there is a need of a repair method that substantially minimizes a defect rate of a panel caused by a bright point.

SUMMARY

By way of example only, in one embodiment, a liquid crystal display panel includes a substrate, a hole disposed in the substrate and an opaque substance filling in the hole. The hole is configured to be located in an area corresponding to a bright point.

In other embodiment, a method for repairing a liquid crystal display panel having a substrate is provided. An area corresponding to a bright point is sensed and a hole is formed on the substrate. The hole is configured to be located in the area corresponding to the bright point. The hole is filled in with an opaque substance.

BRIEF DESCRIPTION OF THE DRAWINGS

These and other objects of the invention will be apparent from the following detailed description of the embodiments with reference to the accompanying drawings, in which:

FIGS. 4A and 4B are sectional views illustrating a liquid crystal display panel according to an embodiment;

FIG. 6A to 6e are sectional views illustrating a method of repairing the liquid crystal display panel of FIG. 4A according to a first embodiment;

FIG. 7A to 7D are sectional views illustrating a method of repairing the liquid crystal display panel of FIG. 4A according to a second embodiment.

DETAILED DESCRIPTION OF THE PREFERRED EMBODIMENT

Reference will now be made in detail to the preferred embodiments, examples of which are illustrated in the accompanying drawings.

Figure 1:
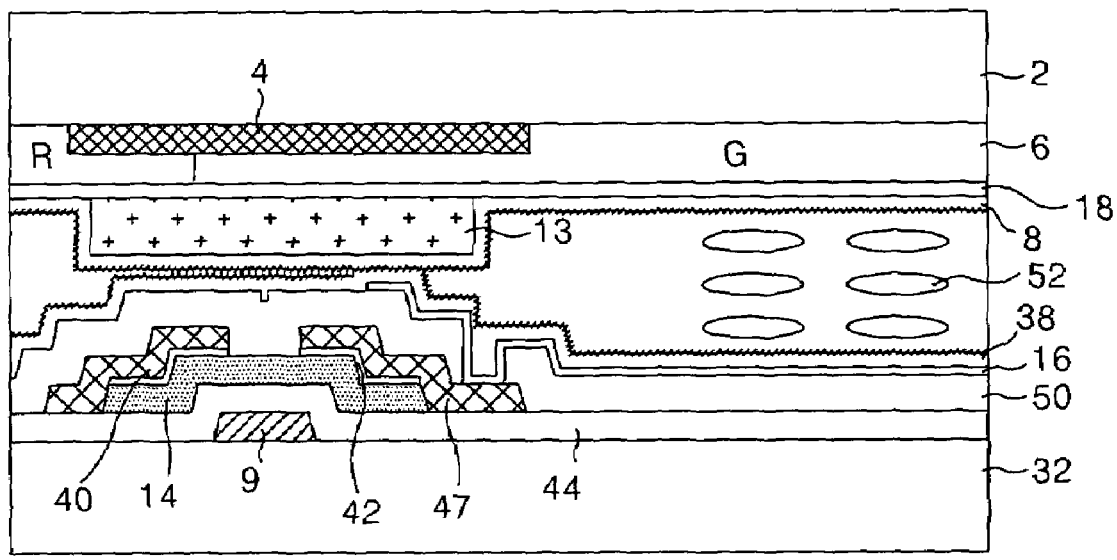
FIG. 1 is a sectional view illustrating a liquid crystal display panel of TN mode of the related art.
Figure 2:
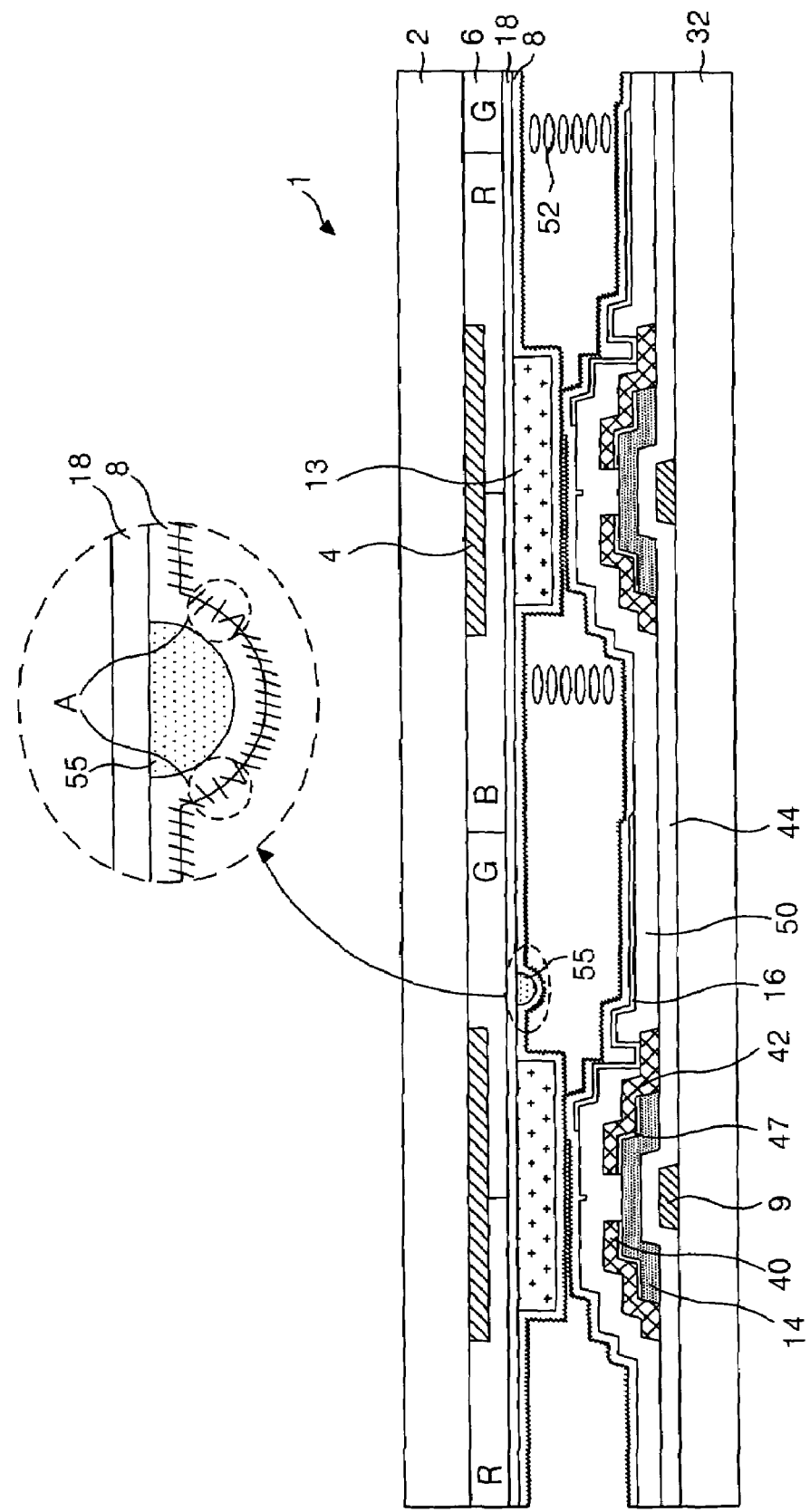
FIG. 2 is a sectional view for explaining an alignment defect caused by particle in the air.
Figure 3:
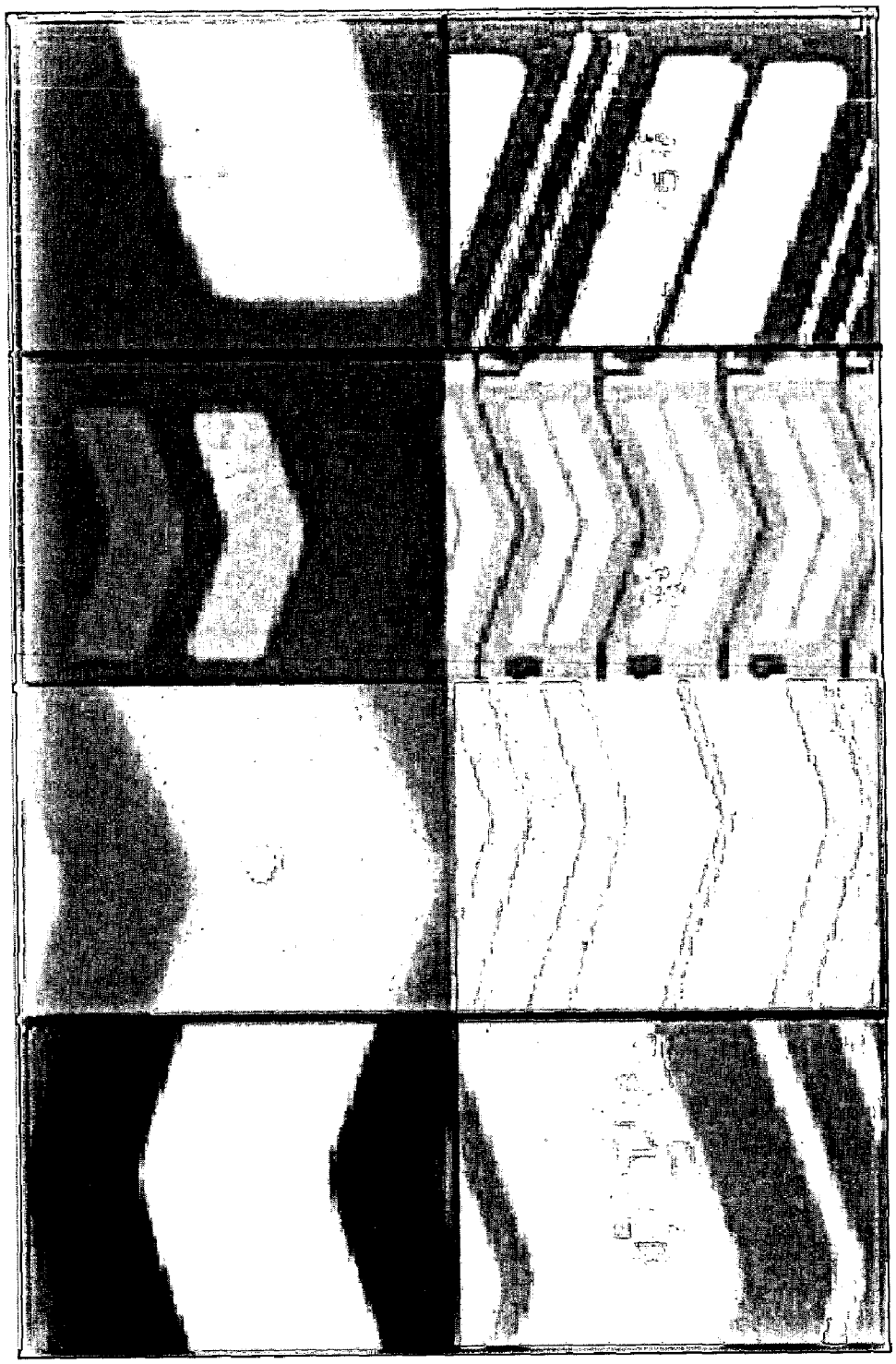
FIG. 3 is a photo illustrating a bright point defect of FIG. 2.
Figure 4A:
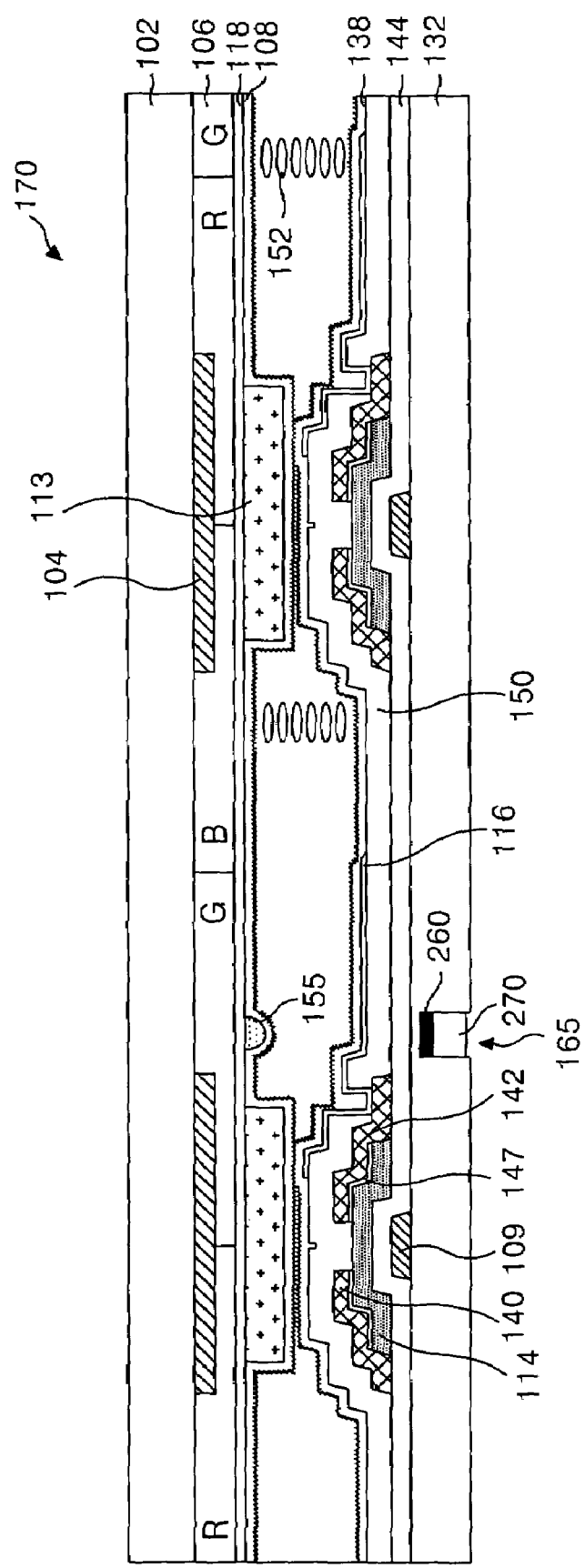

FIGS. 4A and 4B are sectional views illustrating a liquid crystal display panel according to one embodiment. FIG. 4A illustrates that a micro hole is formed in a lower substrate and FIG. 4B illustrates that a micro hole is formed in an upper substrate.

Referring to FIGS. 4A and 4B, a liquid crystal display panel 170 according to the embodiment includes an upper array substrate 102, a lower array substrate 132 and a liquid crystal material 152. The upper array substrate (or a color filter array substrate) 102 has a black matrix 104, a color filter 106, a common electrode 118, a pattern spacer 113, and an upper alignment film 108 which are sequentially formed on an upper substrate 102. The lower array substrate (or a thin film transistor substrate) 132 has a thin film transistor (hereinafter, referred to as "TFT"), a pixel electrode 116 and a lower alignment film 138 which are formed on a lower substrate 132. The liquid crystal material 152 is injected into an inner space between the upper array substrate 102 and the lower array substrate 103.

In the upper array substrate 102, the black matrix 104 is formed in an area of gate lines and data lines (not shown) and a TFT area of the lower array substrate 132. It provides a cell area where a color filter 106 is to be formed. The black matrix 104 is formed of polyimide, in which a pigment of carbon system is mixed, to prevent light leakage and absorbs an external light, thereby acting to increase contrast. The color filter 106 is formed to extend to the black matrix 104 and the cell area divided by the black matrix 104. The color filter 106 is formed with R, G and B filters to realize R, G and B colors. A common voltage is supplied to the common electrode 118 to control the movement of the liquid crystal material 152. The pattern spacer 113 operates to keep a cell gap between the upper array substrate and the lower array substrate.

In the lower array substrate 132, the TFT includes a gate electrode 109 formed along with a gate line; semiconductor layers 114, 147 overlapping the gate electrode 109 with an interposed gate insulating film 144; and source/drain electrodes 140, 142 formed together with a data line (not shown) with the semiconductor layers 114, 147 disposed therebetween. The TFT supplies a pixel signal to a pixel electrode 116 from the data line in response to a scan signal from the gate line.

The pixel electrode 116 is in contact with a drain electrode 142 of the TFT via a passivation film 150 disposed between the pixel electrode 116 and the drain electrode 142. The pixel electrode 116 is formed of a transparent conductive material with high light transmittance. The upper and the lower alignment films 108 and 138 have the liquid crystal material 152 aligned and are formed by applying an alignment material such as polyimide and performing a rubbing process. If the liquid crystal display panel 170 is driven in an IPS mode, it may have the common electrode 118 formed on the lower substrate 132. An overcoat layer (not shown) is formed on the color filter 106 of the upper substrate 102. The overcoat layer compensates for a step difference of the color filter 106.

A bright point may be generated at an area where an alignment defect of the liquid crystal display panel 170 is generated by a particle 155 intermixed in the liquid crystal display panel 170. The liquid crystal display panel 170 provides a micro hole 165 formed in one of the upper substrate 102 and the lower substrate 132 corresponding to the area where the bright point is generated. An opaque substance 260 may fill in some part of the micro hole 165. A transparent substance 270 may fill in other part of the micro hole 165 after the opaque substance fills in the micro hole 165. In FIG. 4B, the micro hole 165 is formed in the upper substrate 102 and filled in with the opaque substance 260 and the transparent substance 270.

Figure 5A:
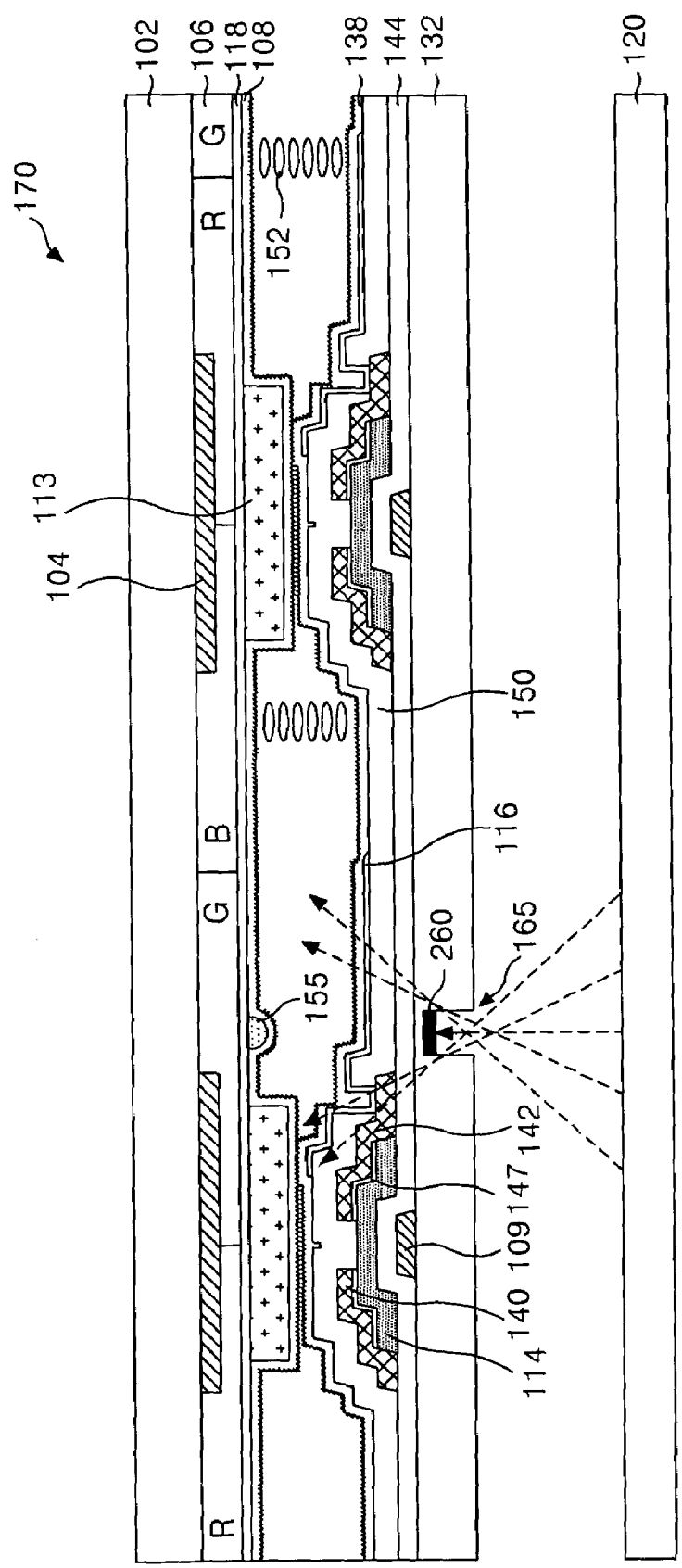
FIGS. 5A and 5B are sectional views illustrating light irradiated to a micro hole from a backlight unit.

FIG. 5A illustrates that the opaque substance 260 filled in the micro hole 165 intercepts light irradiated to the liquid crystal display panel 170 of FIG. 4A from a backlight unit 120. The backlight unit 120 is arranged on a rear surface of the lower array substrate 132 in FIG. 5A. Due to the interception of light, it is possible to darken the area where the alignment defect of the liquid crystal display panel 170 is generated, i.e., the area where the bright point is generated.

Figure 5B:
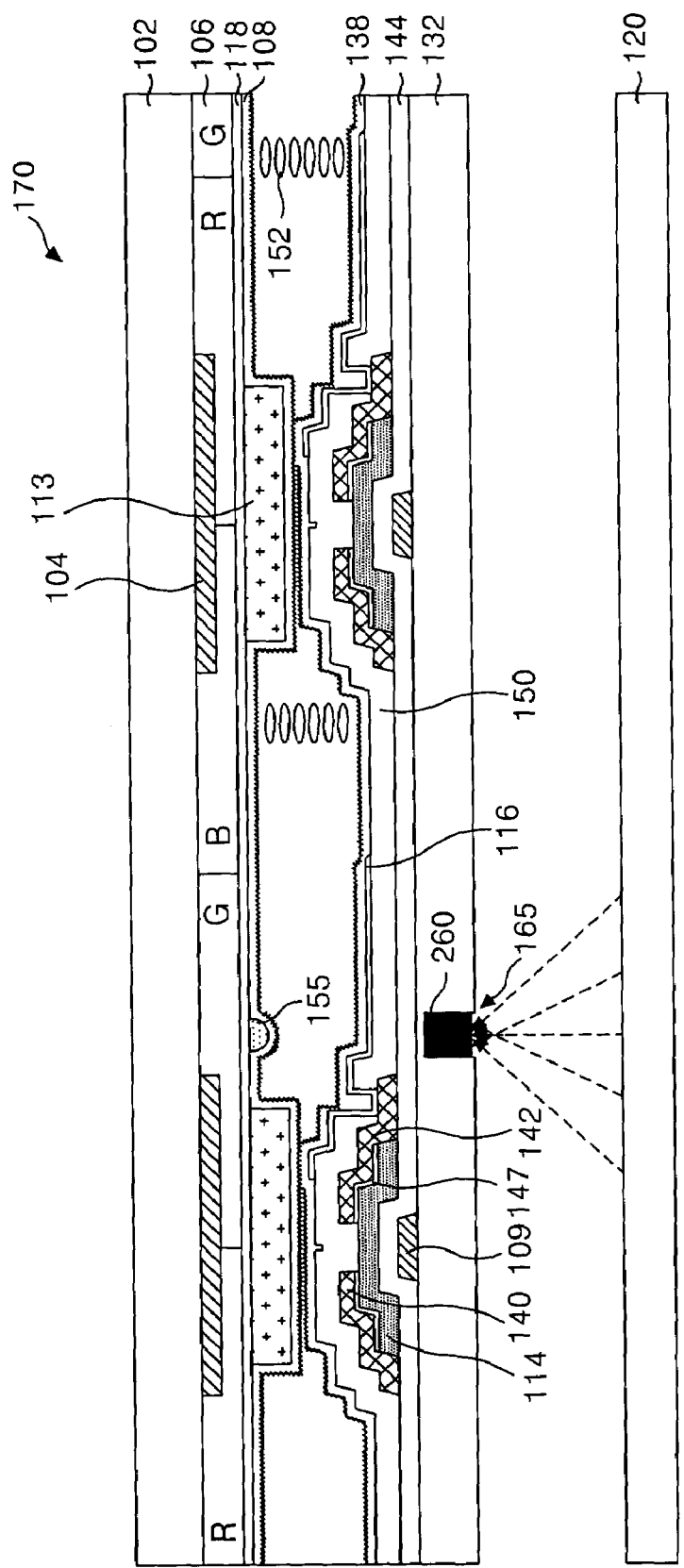

In FIG. 5A, the opaque substance 260 fills in only some part of the micro hole 165. Referring to FIG. 5B, the opaque substance 260 fully fills in the micro hole 165. Light irradiated to the area where the bright point is generated from the backlight unit 120 is intercepted. Further, the light from the backlight unit 120, which is irradiated to cells adjacent to the micro hole 165, may be intercepted by the opaque substance 260. Accordingly, the aperture ratio of the cells adjacent to the micro hole 165 may become reduced. It is desirable that the opaque substance 260 fills in only some part of the micro hole 165 rather than the entire micro hole 165.

In FIGS. 6A-6E, a method of repairing the liquid crystal display panel of FIG. 4A according to the first embodiment is described. In FIGS. 6A-6E, the micro hole 165 is formed in the lower substrate 132. Accordingly, the lower substrate 132 is disposed in an upper position with respect to the upper substrate 102 for convenience of explanation in FIGS. 6A-6E. In other embodiment, the micro hole 165 may be formed in the upper substrate 102 or both the upper and lower substrates 102 and 132 upon needs.

In FIG. 6A, a bright point is generated in the liquid crystal display panel 170 by the particle 155 intermixed between the common electrode 118 and the upper alignment film 108. Accordingly, the micro hole 165 is formed in the lower substrate 132 corresponding to the area where the bright point is generated.

In this embodiment, the micro hole 165 is formed by using a micro drill. The micro hole 165 may be formed in a range of 20 μm to 500 μm in accordance with a size of the liquid crystal display panel 170 and a degree of a light leakage caused by the intermixed particle 155. An end drill capable of forming a circle type micro hole and a straight type micro hole in accordance with a shape of the intermixed particle 155 may be used with the micro drill. Alternatively, or additionally, a micro milling may be used as a device for forming the micro hole 165. The micro milling may form an accurate and various shapes of micro hole 165.

Figure 6B:
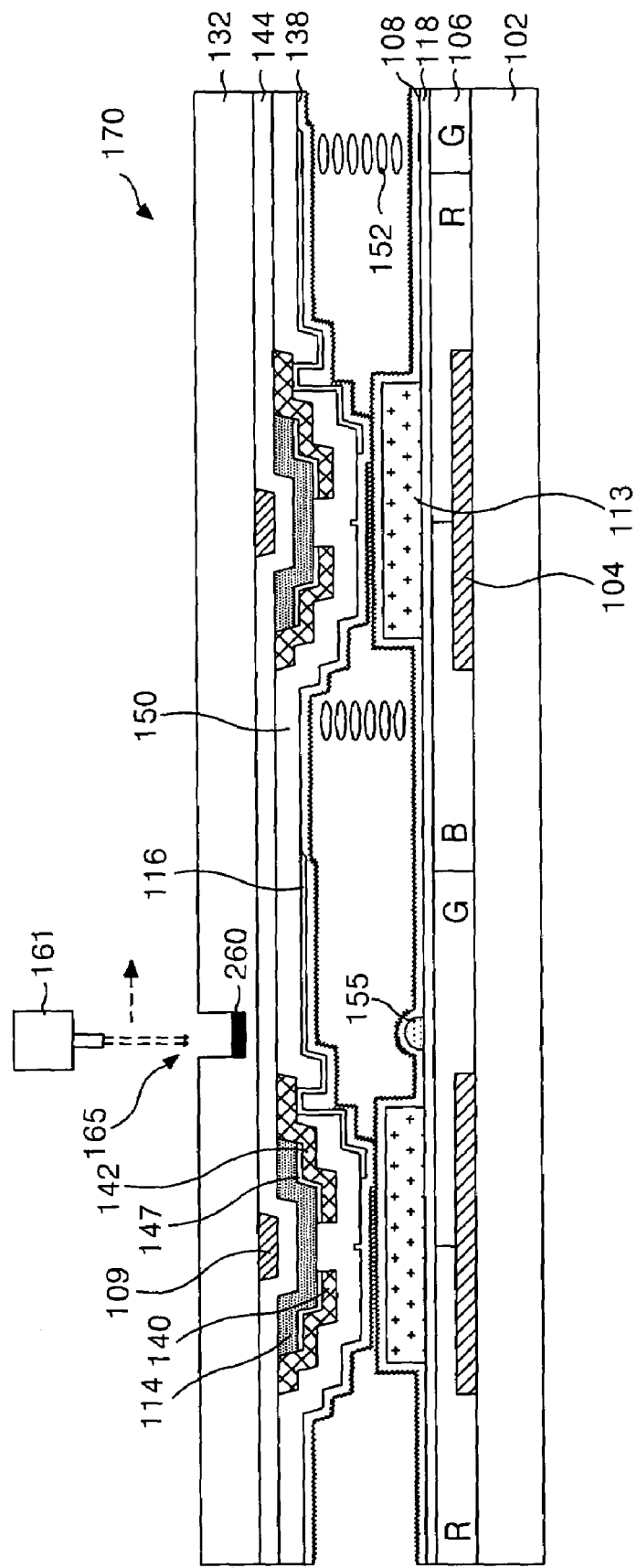

In other embodiment, a laser may be used to form the micro hole 165. In FIG. 6B, a laser 161 is used to form the micro hole 165. The laser 161 may include a NDYAG (Neodymium: Yttrium Aluminum Garnet) laser having a wavelength of 266 nm. Various other lasers having a wavelength of 50~300 nm are possible.

Figure 6C:
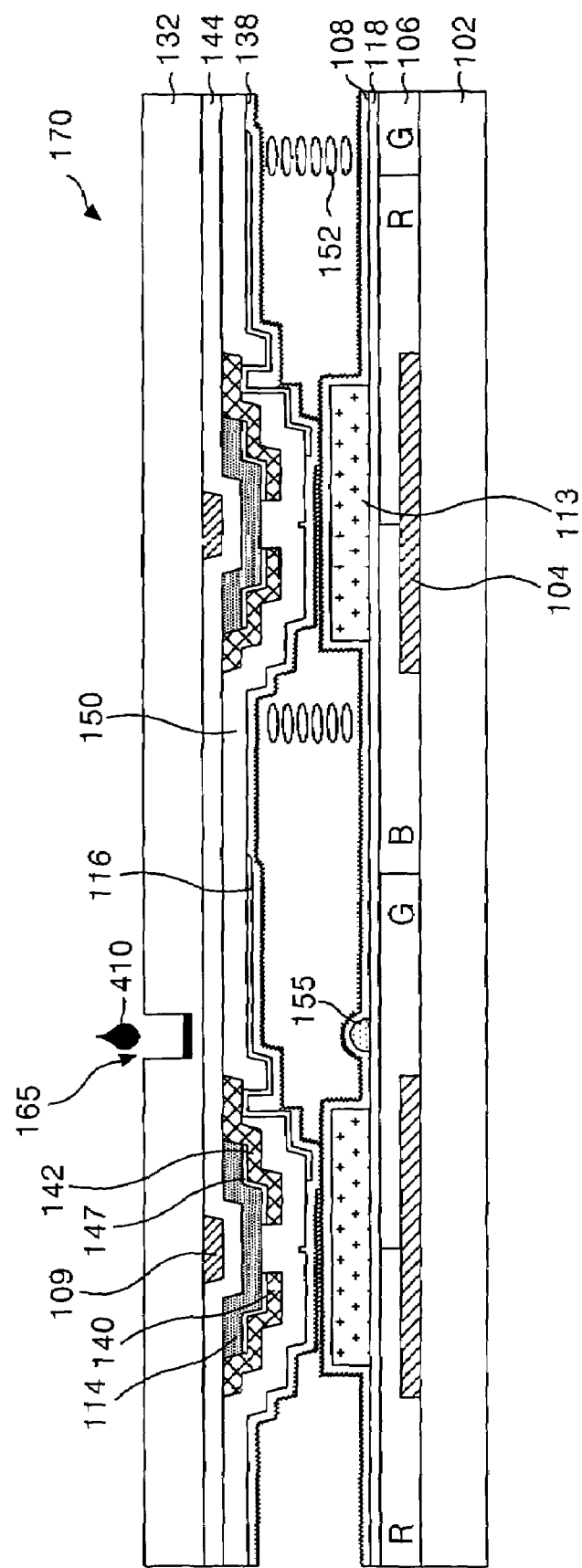

In FIG. 6C, a colored pigment 410 such as a black or gray pigment is dropped by using an ink jet in the micro hole 165 formed in the lower substrate 132. The micro hole 165 is filled in with the colored pigment 410. The colored pigment 410 may include materials used for the color filter 106 or materials realizing color identical to the color filter 106. The colored pigment 410 is dropped to the extent that it fills in some part of the micro hole 165, as shown in FIG. 6C.

Figure 6D:
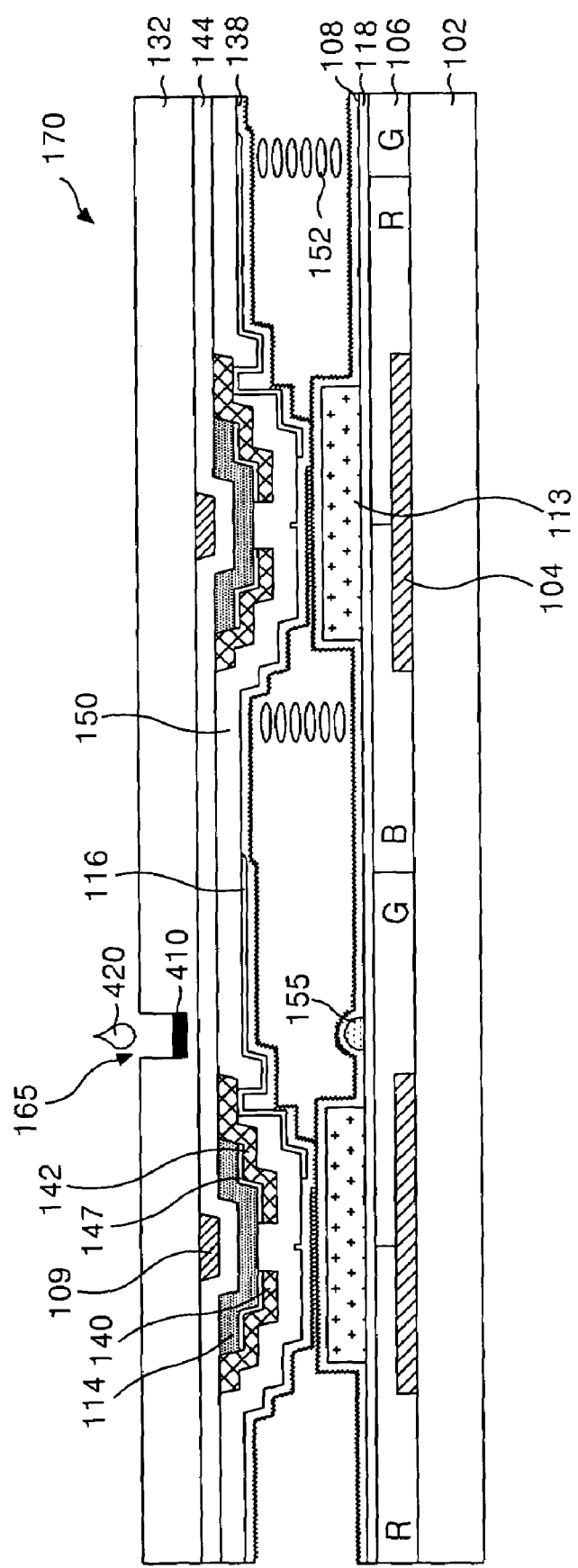

In FIG. 6D, a transparent pigment 420 is dropped in the micro hole 165 after the colored pigment 410 is dropped. The transparent pigment 420 fills in the remaining part of the micro hole as shown in FIG. 6E.

As described above, when the bright point is generated in the liquid crystal display panel 170, the micro hole 165 is formed by the micro drill 160, the micro milling or the laser in the lower substrate 132. The micro hole 165 is generated in the area corresponding to the bright point of the liquid crystal display panel 170. The colored pigment 410 fills in the formed micro hole 165 to darken the bright point such that light from the backlight unit 120 (FIGS. 5A and 5B) may not pass through the liquid crystal display panel 170. As a result, a generation of a bright point may be reduced and a defect ratio may be minimized. Accordingly, a yield of the liquid crystal display panel 170 may improve.

Figure 7A:
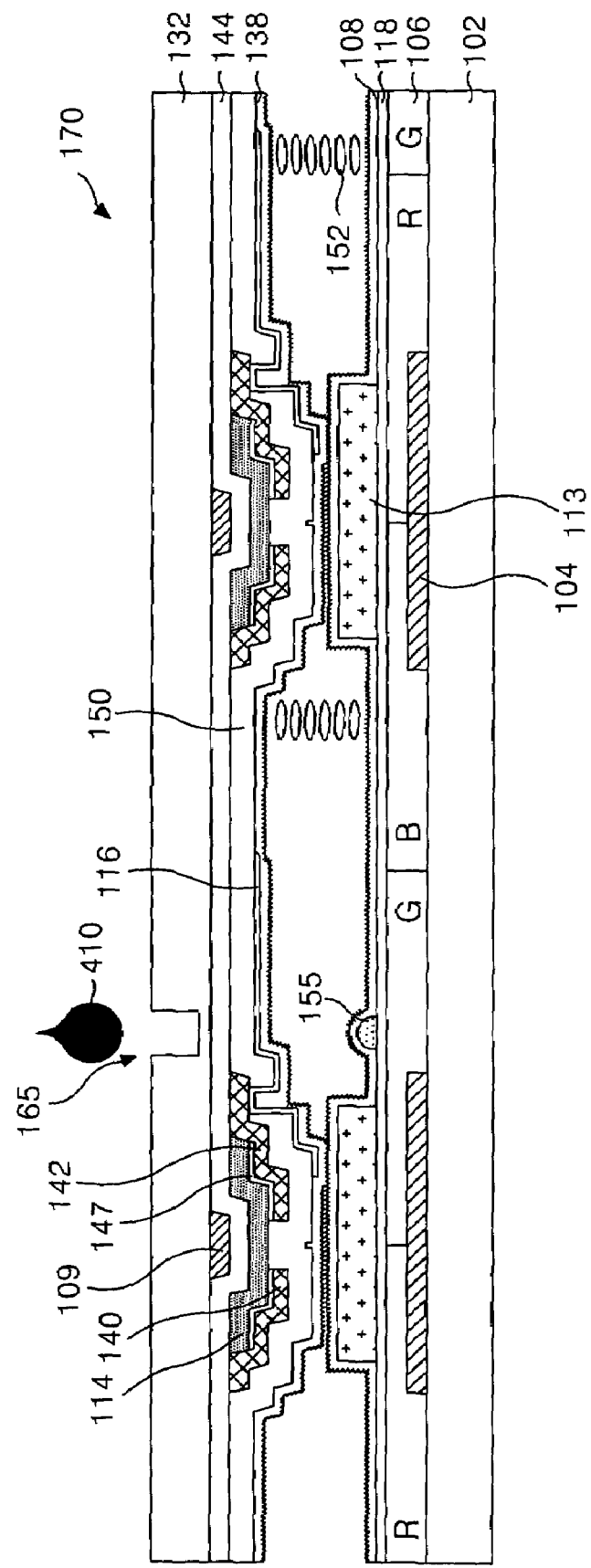

FIGS. 7A to 7D illustrate a method of repairing the liquid crystal display panel 170 of FIG. 4A according to a second embodiment. In FIGS. 7A to 7D, the lower substrate 132 is shown at the upper position with respect to the upper substrate 102 for convenience of description only. In FIG. 7A, the colored pigment 410 such as a black or a gray pigment is dropped in the micro hole 165.

Figure 7C:
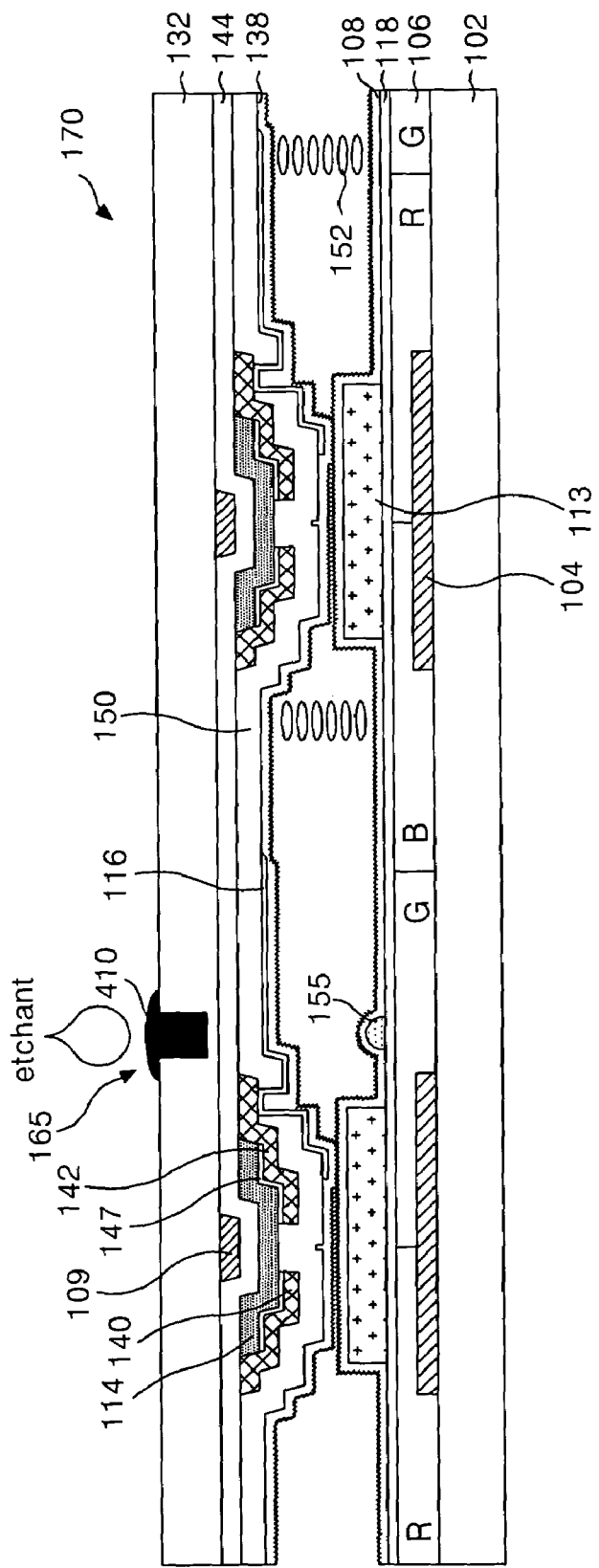

In FIG. 7B, the colored pigment 410 fully fills in the micro hole 165 to the extent that it slightly covers a surface of the lower array substrate 132. In FIG. 7C, an etchant is applied to remove the colored pigment 410 from an upper part of the micro hole 165. As a result, the colored pigment 410 remains only in some part of the micro hole 165, which is shown as a lower part of the micro hole 165 in FIG. 7D. After the colored pigment 410 is partially removed from the micro hole 165, the transparent pigment 420 may fill in the remaining part of the micro hole 165, as previously shown in FIGS. 6C and 6D.

Figure 8A:
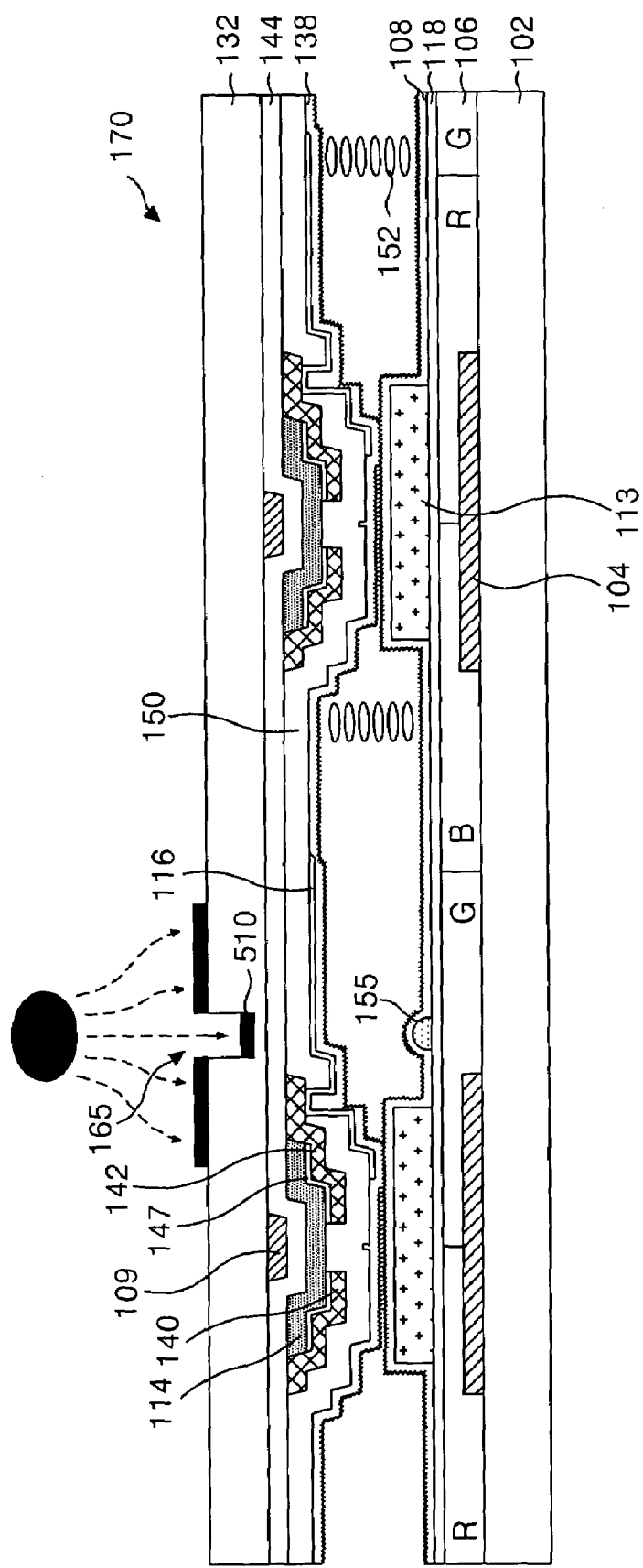
FIG. 8A to 8D are sectional views illustrating a method of repairing the liquid crystal display panel of FIG. 4A according to a third embodiment.

FIGS. 8A to 8D illustrate a method of repairing the liquid crystal display panel 170 of FIG. 4A according to a third embodiment. In FIGS. 8A to 8D, the lower substrate 132 is illustrated at the upper position for convenience of description. In FIG. 8A, a colored electrode material 510 is deposited in the micro hole 165 on the lower substrate 132. The colored electrode material 510 is also deposited on the surface of the lower substrate 132, as shown in FIG. 8A. The colored electrode material 510 may include a black-colored electrode material such as chrome (Cr) or molybdenum (Mo) by using a deposition method.

Figure 8B:
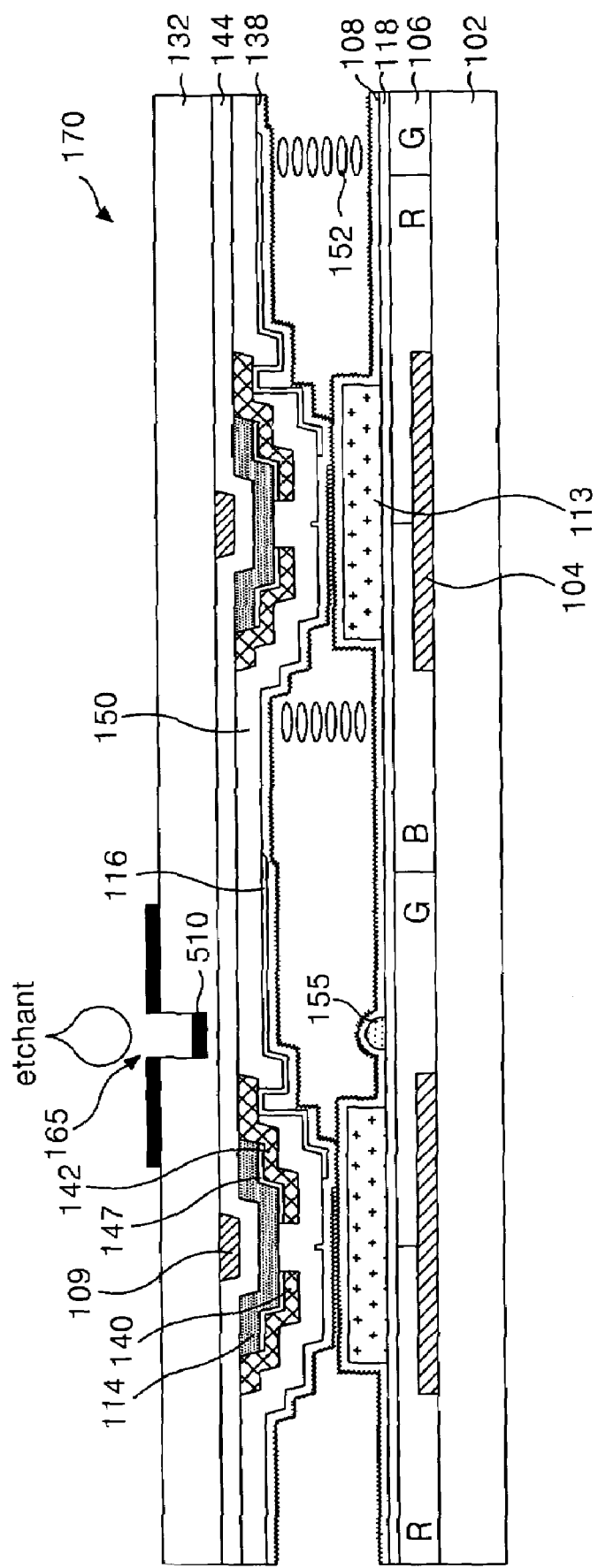
Figure 8C:
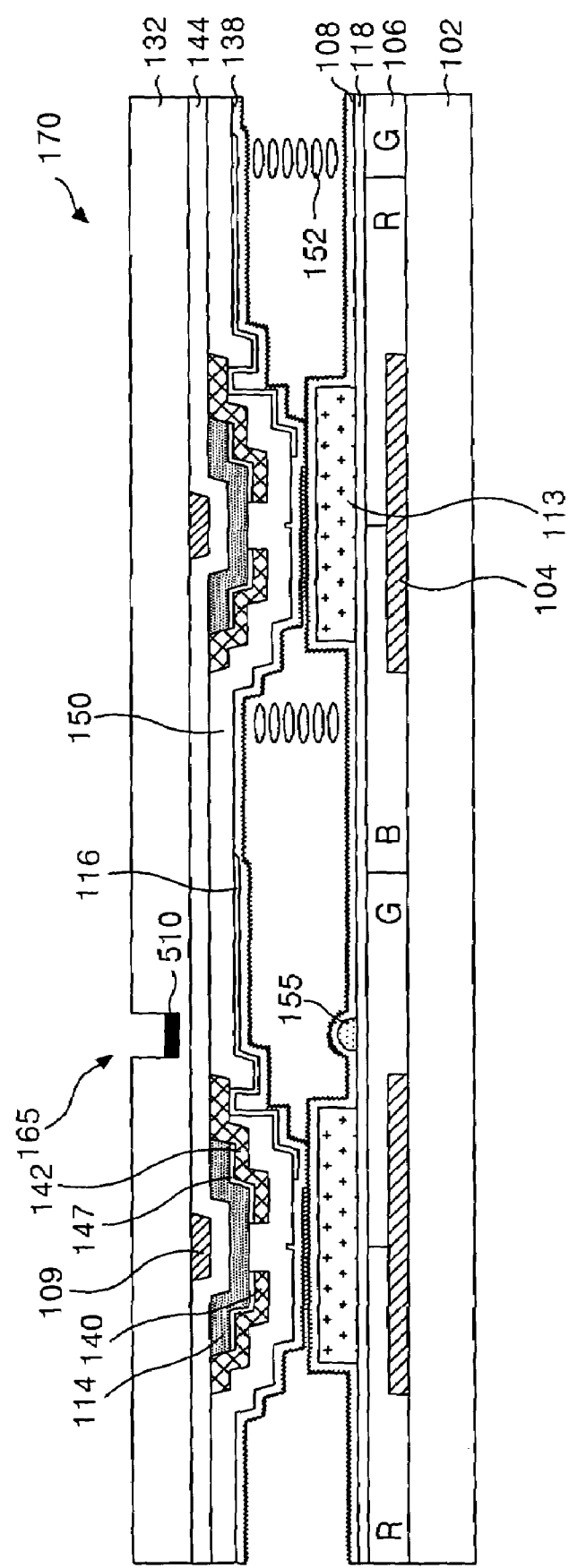
Figure 8D:
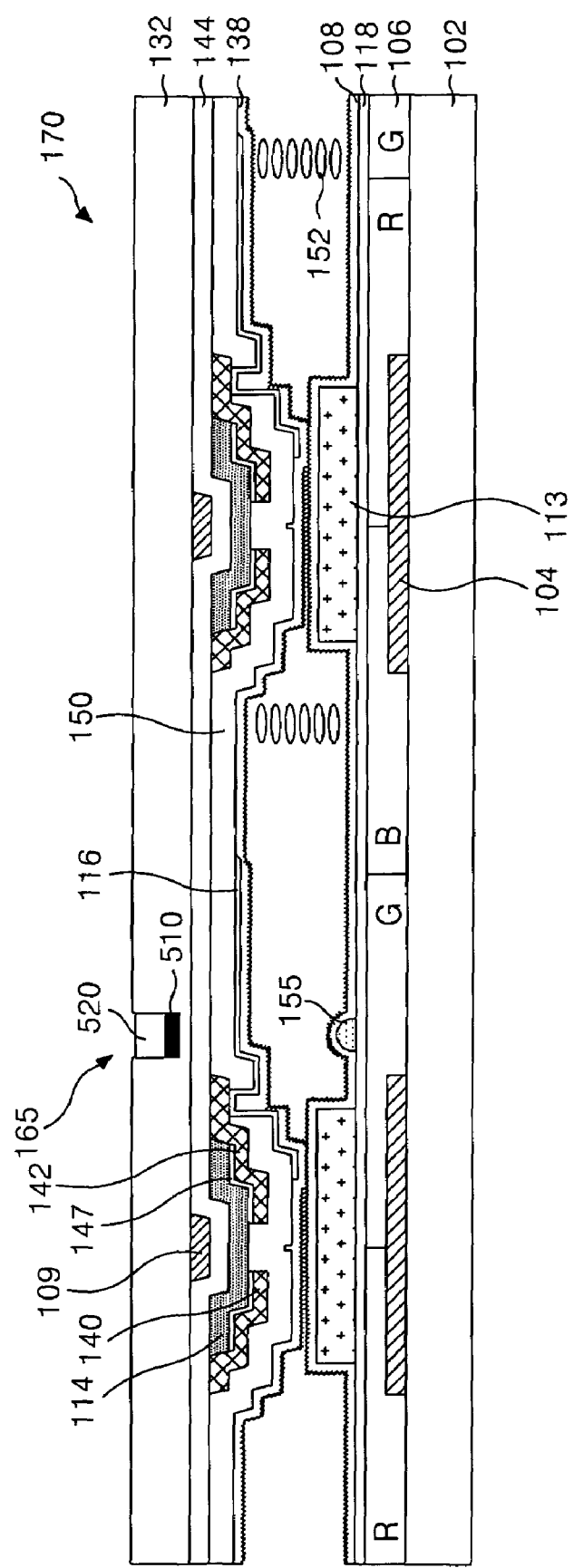

In FIG. 8B, an etchant may be used to remove some of the colored electrode material 510 applied to the lower substrate 132. The colored electrode material 510 remains in some part of the micro hole 165 as a result of etching as shown in FIG. 8C. Because the micro hole 165 formed on the lower substrate 132 does not perfectly penetrate the lower substrate 132, the etchant may not reach the colored electrode material 510 filled in the micro hole 165 and it may not remove the colored electrode material 510 shown in FIG. 8C with ease as. On the other hand, the colored electrode material 510 deposited on the surface of the lower substrate 132 is easily removed by the etchant. After the etching, a transparent pigment 520 may fill in the remaining part of the micro hole 165, as shown in FIG. 8D.

In this embodiment, the colored electrode material 510 is applied by using the deposition method such as a vacuum deposition. The vacuum deposition may be used with the colored pigment as previously described.

The method, as described above in connection with the first, second and third embodiments, may be in use with various types of a liquid crystal display panel such as a liquid crystal display panel of electrical controlled birefringence (ECB), vertical alignment (VA) mode, IPS mode and TN mode.

As described above, when the bright point is generated in the liquid crystal display panel, the micro hole is formed by the micro drill, the micro milling or the laser in the lower substrate, the upper substrate or both substrates. The micro hole is generated in the area corresponding to the bright point of the liquid crystal display panel. The colored pigment or the colored electrode material fills in the formed micro hole to darken the bright point such that light from the backlight unit may not pass through the liquid crystal display panel. As a result, a generation of the bright point may be substantially reduced and a defect ratio may be minimized. Accordingly, the liquid crystal display panel may be repaired and the marketability of the liquid crystal display panel may be preserved. Accordingly, a yield of the liquid crystal display panel may improve.

Although the invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display panel including an upper substrate and a lower substrate, comprising:
   a hole disposed in one of the upper substrate and the lower substrate, the hole configured to be located in an area corresponding to a bright point;
   an opaque substance partially filling in a lower part of the hole; and
   a transparent substance filling in an upper part of the hole, wherein the transparent substance includes a transparent pigment and is formed on the opaque substance.

2. The liquid crystal display panel according to claim 1, further comprising a black matrix and a color filter on the upper substrate.

3. The liquid crystal display panel according to claim 2, wherein the opaque substance includes a colored metal substance.

4. The liquid crystal display panel according to claim 3, wherein the colored metal substance is the same substance as the black matrix.

5. The liquid crystal display panel according to claim 1, wherein the opaque substance includes a colored pigment.

6. The liquid crystal display penel according to claim 5, wherein the colored pigment includes a substance realizing the same color as the color filter.

7. The liquid crystal display panel according to claim 5, wherein the colored pigment includes the same substance as the color filter.

8. The liquid crystal display panel according to claim 5, wherein the colored pigment comprises a substance realizing one of black color and gray color.

9. The liquid crystal display panel according to claim 1, wherein the hole has a diameter of 20 μm to 500 μm.

10. A method for repairing a liquid crystal display panel having a an upper substrate and a lower substrate, comprising:
    sensing an area corresponding to a bright point;
    forming a hole in one of the upper substrate and the lower substrate, the hole configured to be located in the area corresponding to the bright point;
    partially filling an opaque substance in a lower part of the hole; and
    filling a transparent substance in an upper part of the hole, wherein the transparent substance includes a transparent pigment and is formed on the opaque substance.

11. The method according to claim 10, wherein forming the hole comprises forming the hole with at least one of a micro drill, a micro milling, or a laser.

12. The method according to claim 11, wherein forming the hole comprises supplying a light having a wavelength of about 50 nm to 300 nm with the laser.

13. The method according to claim 10, wherein the partially filling the opaque substance in the lower part of the hole comprises:
    filling in an entire hole with the opaque substance; and
    partially removing the opaque substance with an etchant.

14. The method according to claim 10, wherein filling in the hole comprises forming the opaque substance with the same substance as one of a black matrix and a color filter.

15. The method according to claim 14, wherein filling in the hole comprises forming the opaque substance with a substance realizing the same color as the color filter.

16. The method according to claim 10, wherein filling in the hole comprises forming the opaque substance with one of a colored pigment and a colored metal substance.

17. The method according to claim 16, wherein forming the opaque substance comprises performing one of a vacuum deposition, a spraying process and a sputtering.

* * * * *

UNITED STATES PATENT AND TRADEMARK OFFICE
CERTIFICATE OF CORRECTION

PATENT NO. : 7,612,861 B2  Page 1 of 1
APPLICATION NO. : 11/205983
DATED : November 3, 2009
INVENTOR(S) : Oh Nam Kwon et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 668 days.

should read (*) Notice: Subject to any disclaimer, the term of this patent is extended or adjusted under 35 U.S.C. 154(b) by 921 days.

In the Claims,

In column 7, claim 6, line 9, after "liquid crystal display" replace "penel" with --panel--.

Signed and Sealed this

Third Day of August, 2010

David J. Kappos
*Director of the United States Patent and Trademark Office*